No. 688,094.  
E. P. JONES.  
DRILL HOLDER.  
(Application filed Jan. 30, 1900.)

Patented Dec. 3, 1901.

(No Model.)

WITNESSES:

INVENTOR  
Edward P. Jones  
BY  
ATTORNEYS

UNITED STATES PATENT OFFICE.

EDWARD P. JONES, OF BRECKENRIDGE, COLORADO.

DRILL-HOLDER.

SPECIFICATION forming part of Letters Patent No. 688,094, dated December 3, 1901.

Application filed January 30, 1900. Serial No. 3,334. (No model.)

*To all whom it may concern:*

Be it known that I, EDWARD P. JONES, a citizen of the United States, and a resident of Breckenridge, in the county of Summit and State of Colorado, have invented a new and Improved Drill-Holder, of which the following is a full, clear, and exact description.

The purpose of this invention is to provide means for adjustably holding a rock-drill, the device permitting the drill to be placed in any position that may be desired with respect to the column.

This specification is the disclosure of one form of the invention, while the claims define the actual scope thereof.

Reference is to be had to the accompanying drawings, forming a part of this specification, in which similar characters of reference indicate corresponding parts in both views.

Figure 1:
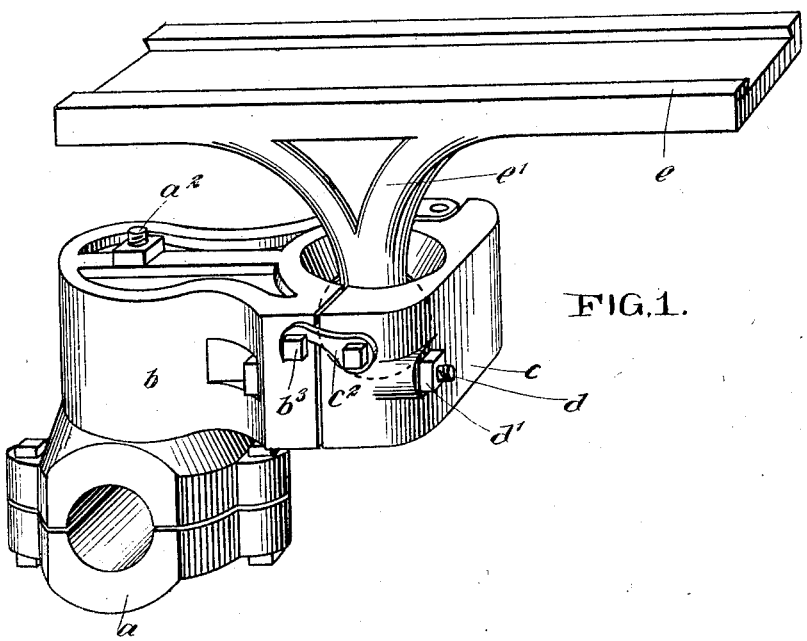
Figure 2:
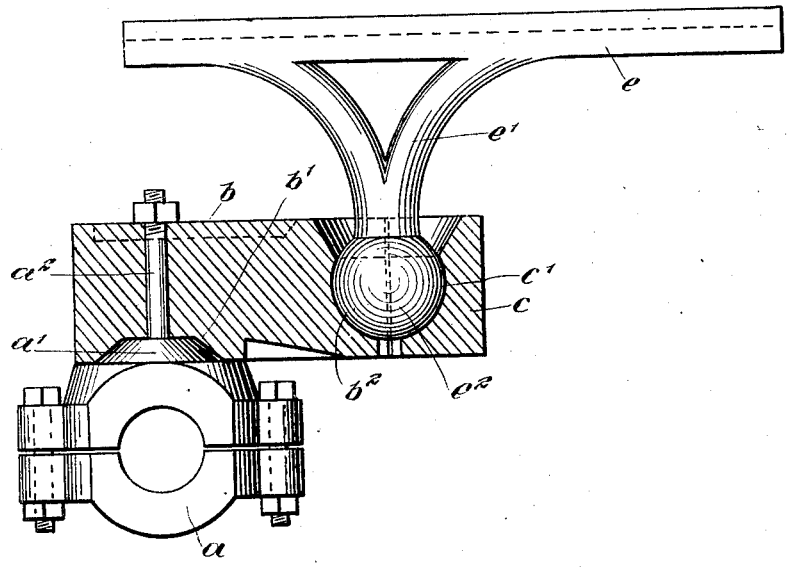

Figure 1 is a perspective view of the invention, and Fig. 2 is a view with parts in section.

A clamp $a$ of any desired construction is provided for engagement with the column or a part thereof, on which column the drill is supported, as will be understood. This clamp is formed with a portion $a'$ in the shape of a frustum of a cone and adapted to set into a corresponding cavity $b'$, formed in the holder $b$. A bolt $a^2$ is fastened to the clamp $a$ axially coincident with the portion $a'$ thereof, and this bolt extends through the holder $b$ and is fitted with a nut for securing it. By loosening the nut the holder $b$ may be freely adjusted around the axis of the portion $a'$ of the clamp to place the holder in any position desired. When the nut is tightened, the parts $a$ and $b$ are held rigidly together.

The holder $b$ has a recess $b^2$ formed therein at the end opposite the clamp $a$, and a jaw $c$ is hingedly mounted on such end of the holder $b$. This jaw has a recess $c'$ formed therein, which corresponds with the recess $b^2$, such recesses forming a spherical socket when the parts are in the position shown in the drawings. For holding the jaw $c$ in closed position I provide a hook $c^3$, pivoted on the jaw $c$ and working with a headed pin $b^3$ on the holder. This hook $c^3$ serves to hold the jaw loosely in position, and when it is desired to draw the jaw up into tightened position the nut $d'$ of the bolt $d$ is tightened, such bolt passing through the jaw $c$ and a portion of the holder $b$. This draws the jaw forcibly against the holder. The shell $e$ of the drill, on which the drill is adjustably mounted to slide in the usual manner, is provided with a stout arm $e'$, terminating in a spherical enlargement or ball $e^2$, which is received in the cavities $b^2$ and $c'$. When the bolt $d$ is loosened and the hook $c^2$ engaged with the pin $b^3$, the ball $e^2$ may be turned freely in the socket to adjust the drill; but when the bolt $d$ is tightened the jaw $c$ will be forced against the ball $e^2$, and the slide $e$ will be held rigid with the holder $b$. This arrangement of the ball and socket enables the drill to be placed at any desired angle with respect to the horizontal position, and taking this adjustment with the adjustment afforded by the movement of the holder $b$ on the clamp $a$ it will be seen that any adjustment desirable in the operation of a rock-drill may be attained.

Having thus described my invention, I claim as new and desire to secure by Letters Patent—

1. A drill-holder, comprising a clamp, one member of which is formed with a frusto-conical projection, a bolt attached to said member centrally with respect to said projection, a holder proper through which the bolt is passed, the holder proper being adjustable on the bolt, a jaw hingedly mounted on the holder proper and having a cavity therein matching with a corresponding cavity in the holder proper, a latch serving to hold the jaw in closed position, and an arm having a spherical enlargement or ball thereon, the enlargement or ball being adjustably held in the cavities of the jaw and holder proper, and the arm having connection with the drill.

2. A drill-holder, comprising a clamp adapted to engage the column or support, a holder proper mounted to turn on the clamp, means for locking the holder stationary on the clamp, a movable jaw mounted on the holder proper and having a cavity therein registering with a cavity in the holder, to form a socket, means for holding the jaw in closed position, and an arm having connection with the drill and formed with a spherical enlargement or ball fitted and held in the said socket.

3. A drill-holder, comprising a clamp adapted to engage a support, a holder proper having one end mounted to turn on the clamp and provided at its other end with a recess, means for locking the holder stationary on the clamp, a hinged jaw on the recessed end of the holder proper and provided with a recess corresponding with the recess of said holder and forming therewith a socket, a drill-carrier provided with an arm terminating in a spherical enlargement or ball fitting in the said socket, and means for locking the free end of the jaw to the holder and forcing the said jaw against the ball, as and for the purpose set forth.

In testimony whereof I have signed my name to this specification in the presence of two subscribing witnesses.

EDWARD P. JONES.

Witnesses:
J. W. SWISHER,
S. D. SWISHER.